July 10, 1928.
E. E. VIDARSHOF
ADJUSTABLE BORING BAR HOLDER
Original Filed Feb. 17, 1923
1,676,937
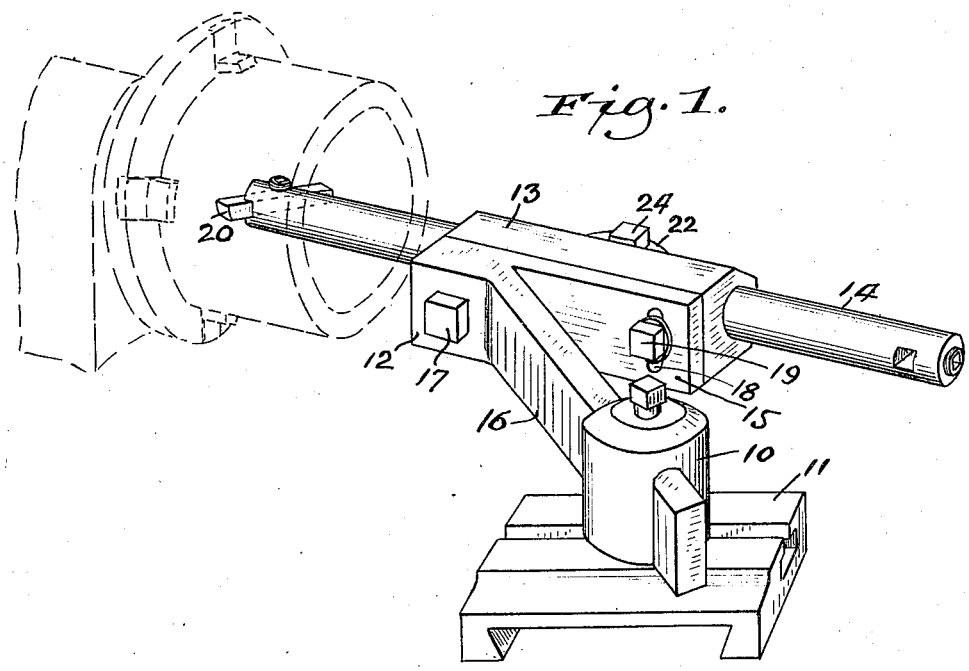
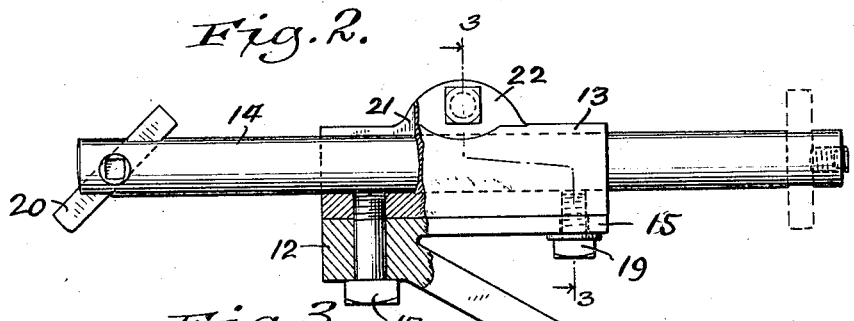
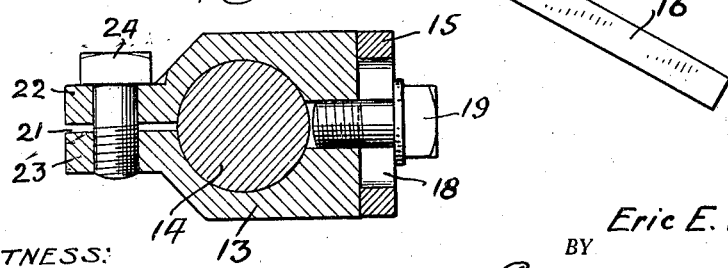
WITNESS:
Fred Palm
DEL.
INVENTOR.
Eric E. Vidarshof.
BY
Erwin, Wheeler & Woolard
ATTORNEYS.

Patented July 10, 1928.

1,676,937

UNITED STATES PATENT OFFICE.

ERIC E. VIDARSHOF, OF WESTBY, WISCONSIN.

ADJUSTABLE BORING-BAR HOLDER.

Application filed February 17, 1923, Serial No. 619,671. Renewed April 25, 1925.

In devices of this class it is desirable that the range of adjustment be such that the cutting tool which is supported by the bar may be accurately and firmly positioned with respect to the work, and that there be no limitation upon such adjustment in order that all demands thereon may be met. My improved construction enables me to effect a practically universal adjustment, and this is accomplished readily by reason of the construction which I employ.

My improved device is adapted to be supported in the tool post of any ordinary lathe, and is capable of precise adjustment both vertically and radially with relation to the work, so that the cutting tool may be positioned for operation at any desired point. Thus component adjustment of the cutting tool at any point between the extremes of the radial and vertical adjustment may be secured.

The invention will be described in detail and the novelty thereof will be pointed out in the appended claims.

Referring to the drawing:

Figure 1 is a perspective view, showing the construction of my improvement and the manner in which the same is used in operating upon a piece of work rotated by the lathe head.

Fig. 2 is a plan view of my invention.

Fig. 3 is a cross sectional view on the irregular line 3—3, Fig. 2, looking in the direction of the arrows.

In the drawing, the numeral 10 indicates the tool post supported on the slide rest 11 of a lathe. The boring bar holder is composed of two parts 12 and 13, the latter being formed as a clamp for supporting the bar 14. The head of the part 12 is constructed with a branch 15 which lies parallel with the clamp member 13 and with a branch 16 which latter is adapted to be set in the tool post. The head of the part 12 at the juncture of the branches is perforated for the reception of a cap screw 17, which is threaded into the clamp member 13, and which forms a pivotal point for vertical adjustment of the clamping member 13.

Near its free end the branch 15 is provided with a transversely extending slot 18, through which is passed a cap screw 19 likewise threaded into the clamping member 13, and which is adapted to hold the clamping member and the boring bar carried thereby in adjusted vertical position. Radial adjustment of the boring bar with relation to the work is effected through rotation of the post 10 upon the slide rest 11. The provisions for radial and vertical adjustment thus described will enable the cutting tool 20 carried by the bar 14 to be adjusted at the exact point desired with relation to the work.

The clamping member 13 is bored from end to end for the reception of the bar 14, and is provided with a radial slit 21 leading from the bore to its opposite side. Lugs 22 and 23 extend outwardly of the slit 21, and a set screw 24 passed through a perforation in the lug 22 and threaded into the lug 23, exerts a binding pressure upon the bar 14 to hold the latter in longitudinally adjusted position, and prevent rotation thereof under pressure exerted upon the cutting tool carried by the said bar.

The boring bar 14 is provided with a transverse opening at one end, and with a diagonal opening at the other, for the reception of cutting tools, which latter may be secured in fixed position in the said openings by means of the usual set screws.

The invention is economical in construction, readily adjusted to various positions for work, and when adjustment is effected, the parts are firmly held against displacement.

Having thus described my invention, what I claim and desire to secure by Letters Patent of the United States is:

1. In a boring bar holder, a clamping member bored longitudinally for the reception of the bar, and provided with a slit extending outwardly of the bore, means engaging the slitted portion to clamp the boring bar in longitudinally adjusted position and prevent rotation thereof, in combination with a supporting member upon which the clamping member is pivotally mounted to permit vertical adjustment of the bar, and means for maintaining such vertical adjustment, the said supporting member being provided with a branch whereby the boring bar holder is supported in position for operation.

2. A boring bar holder comprising a clamp for the bar and a supporting member upon which the bar is pivoted for vertical adjustment, the supporting member being formed with two branches, one of which extends parallel with the clamping member, and means for securing the clamping member in adjusted vertical position upon the said first branch, the second branch of the supporting member constituting the means whereby the boring bar is supported in position for work.

3. A boring bar holder comprising a clamping member bored longitudinally for the reception of the bar and provided with a slit extending radially from the bore, means for clamping the bar in longitudinally adjusted position and against rotation, a supporting member upon which the clamping member is pivoted, the said supporting member being branched from the pivotal point, one branch lying parallel to the clamping member and transversely slotted for the reception of a screw threaded in the clamping member, whereby vertical adjustment of the boring bar is secured, the other branch of the supporting member constituting the means for holding the boring bar in position for work.

In testimony whereof, I have signed my name at Milwaukee, this 6th day of February, 1923.

E. E. VIDARSHOF.